United States Patent [19]

Verlinden et al.

[11] 4,119,849

[45] Oct. 10, 1978

[54] RADIOGRAPHY

[75] Inventors: Willy Gommaire Verlinden, Edegem; Jozef Eduard Mariën, Boechout, both of Belgium

[73] Assignee: AGFA-Gevaert N.V., Mortsel, Belgium

[21] Appl. No.: 667,565

[22] Filed: Mar. 17, 1976

[30] Foreign Application Priority Data

Mar. 19, 1975 [GB] United Kingdom ............... 11466/75

[51] Int. Cl.[2] ............................................ G03B 41/16

[52] U.S. Cl. ............................................... 250/315 A

[58] Field of Search ........................ 250/315 A, 315 R

[56] References Cited

U.S. PATENT DOCUMENTS

| | | | |
|---|---|---|---|
| 3,873,832 | 5/1975 | Esebe | 250/315 A |
| 3,873,833 | 3/1975 | Allan | 250/315 A |
| 3,914,609 | 10/1975 | Jeromin | 250/315 A |
| 3,935,455 | 1/1976 | Van den Bogaert | 250/315 A |
| 3,971,937 | 7/1976 | Kinoshita | 250/315 A |
| 3,975,626 | 8/1976 | Van Engeland | 250/315 A |

*Primary Examiner*—Craig E. Church

*Attorney, Agent, or Firm*—William J. Daniel

[57] ABSTRACT

A method and apparatus suited for forming radiographs wherein distribution patterns of penetrating radiation representing radiographic information to be recorded are recorded in terms of electrostatic charge patterns on successive charge-receiving areas distributed along a carrier, by bringing such areas successively into a chamber in which each such area is exposed to an ionizable fluid while this is exposed in an electric field to a pattern of penetrating radiation thus producing in such fluid positive and negative charge carriers and forming with the positive or negative charge carriers a corresponding electrostatic charge pattern on such area, the latter being brought by subsequent movement of the carrier to a position outside such chamber where such electrostatic charge pattern is transferable or developable to form a transferable visible record.

8 Claims, 5 Drawing Figures

RADIOGRAPHY

This invention relates to a method and apparatus suited for radiography.

In xeroradiography, such as disclosed in U.S. Pat. No. 2,666,144 of Roland M. Schaffert, Robert C. McMaster and William E. Bixby issued Jan. 12, 1954, an electrostatic image is formed by exposure of a pre-charged photoconductive member (e.g. selenium layer) to an X-ray image thereby producing conductivity in the photoconductor whereby the applied charge leaks off in the exposed areas and a toner-developable charge pattern corresponding with the unexposed or less X-ray exposed areas of the photoconductor is obtained.

In a process called ionography as described in e.g. the U.S. Pat. No. 2,900,515 of Edward L. Criscuolo and Donald T. O'Conner issued Aug. 18, 1959, X-ray imaging is based upon the production of ions by means of X-rays interacting with a gas in a high electric field established by a layer of conductive material, such as a fine wire mesh, placed at a fixed and uniform distance above a conductive plate covered with a charged layer of insulating material. The intensity of X-ray radiation, which is a function of the object being X-rayed, differentially ionizes the air or gas between the layer of conductive material and the plate. This results in differential discharge of the charged layer, whereby an electrostatic image is formed on the insulating material covering the plate.

In a further X-ray imaging system (sometimes also referred to as ionography) which is described by K. H. Reiss, Z. Angew. Physik, Vol. 19, page 1, Feb. 19, 1965 (see also German Pat. No. 1,497,093 filed Nov. 8, 1962 by Siemens AG and published German Patent Application Dt-OS No. 2,226,130 filed May 29, 1972 by Siemens AG) use is made of an arrangement of a pair of electrodes with a potential difference applied between them and a gas filling the gap between the electrodes. A dielectric sheet is mounted on the anode and the cathode is made of or coated with a heavy electron-absorbing metal such as lead. A typical gap width or interelectrode spacing is 0.5 mm, with the gas at atmospheric pressure in the gap, giving a gap width-pressure product in order of 0.5 mm atmosphere. In operation the differentially absorbed X-ray flux incident on the anode penetrates the anode (which is made of a substance transparent to X-rays, such as aluminium or beryllium), traverses the gas in the gap with very little attenuation, and impinges on the cathode, which acts as a photo-emitter, emitting a current into the gas, the current density emitted from a given area being proportional to the incident X-ray flux density. The gas in the gap acts as a gaseous amplifier, the initial current being amplified by electron multiplication and by an avalanche in the presence of an accelerating potential difference. In this manner the initial photoelectric emission current from the cathode is amplified considerably by as much as six orders of magnitude or possibly more.

According to the X-ray imaging system described in the Belgian Pat. No. 792,334 filed Dec. 6, 1972 by Xonics Inc. the emitting cathode of the Reiss system is omitted as a source of electrons and replaced by an X-ray-opaque gas e.g. having an atomic number of at least 36, preferably xenon at superatmospheric pressure which exhibits a very short stopping distance for the resulting photoelectrons produced therein. Because of the high quantum efficiency i.e. greater number of initial primary electrons it becomes unnecessary to operate the gas in the avalanche regime, and the only purpose of the accelerating potential is to ensure full collection of the ionization current.

According to a modified ionographic system described in the U.S. Pat. No. 3,873,833 of Frank V. Allan, John H. Lewis, Katherine J. Lewis, Arthur L. Morsell, Eric P. Muntz, Paul B. Scott and Murray S. Welkowsky issued Mar. 25, 1975 the above defined X-ray-opaque gas is replaced by an X-ray-opaque and electrically non-conducting liquid, e.g. methylene iodide.

It is an object of the present invention to provide a method and apparatus suited for radiography in which a radiograph is formed through ionography on a re-usable charge carrier that can be passed stepwise through the imaging chamber.

By the term "radiography" a recording technique is meant, which makes use of penetrating radiation which includes e.g. X-rays, $\beta$-rays, $\delta$-rays, fast electrons and neutrons capable of effecting ionization in a fluid medium i.e. liquid or gas absorbing said radiation.

According to the present invention, distribution patterns of penetrating radiation representing information to be recorded are recorded in terms of electrostatic charge patterns on successive charge-receiving areas distributed along a carrier, by bringing such areas successively into a chamber in which each such area is exposed to an ionizable fluid being a gas or liquid while this is exposed in an electric field to a pattern of penetrating radiation, thus producing in such fluid positive and negative charge carriers and forming with the positive or negative charge carriers a corresponding electrostatic charge pattern on such area, the latter being brought by subsequent movement of the carrier to a position outside such chamber where such electrostatic charge pattern is transferable or developable to form after transfer a permanent visible record. After effecting such a transfer the corresponding charge-receiving area of the carrier can re-enter the exposure chamber for receiving another electrostatic charge pattern.

The electric field may be established between electrodes located in said chamber so that the receptor passes between them. Thus a DC-potential may be established between a first electrode or a group of electrodes spaced from the operatively positioned charge-receiving surface area of the carrier and a second electrode or group of electrodes disposed behind such surface area. Such a second electrode or group of electrodes may be constituted by an integral part of the carrier, or may be a separate member or members in contact with or close to the rear of the carrier.

The carrier may be in the form of a web, belt or the like member, which has an insulating or dielectric charge-receiving surface. As an alternative the carrier may comprise a conveyor having components or attached elements which provide the charge-receiving surface areas.

Preferably the carrier is of endless form so that the charge-receiving surface areas thereof can be repeatedly used during repeated revolutions of the carrier in one direction. As an alternative, the carrier can comprise a coilable band, web or the like, which can be wound first in one direction and then in the opposite direction through the exposure chamber.

It is preferable for the information-wise modulated radiation dose to be directed onto the charge-receiving carrier from the image-receiving side thereof.

In the most important embodiments of the invention, electrostatic charge patterns on the carrier are developed on such carrier. Thus the application of an electrostatically attractable material to an information-wise charged area on the carrier can proceed simultaneously with the creation of an electrostatic charge pattern on another charge-receiving area of the carrier.

Particular preference is given to methods according to the invention wherein electrostatic charge patterns on the carrier are developed on such carrier by electrostatically attractable material which is then transferred to a receptor material. Transfer of successive "images" may occur onto a single receptor or onto different receptors, e.g. onto separate receptor sheets of transparent resin or other material. By means of the invention it is possible to achieve a radiographic imaging system which permits the high speed production of developed images in conformity with patterns of penetrating radiation, on transparent resin or other film sheets of desired format.

Such particularly preferred methods are preferably carried out so that during a given dwell period of the indexed carrier, an electrostatic charge pattern is formed on one charge-receiving area of the carrier, a previously created charge pattern on another charge-receiving area of the carrier is developed and an image formed by a previous development of another charge pattern on the carrier is transferred to a receptor.

An optional feature of the invention comprises neutralizing residual charges on charge-receiving areas of the carrier following image-transfer.

Another optional feature resides in cleaning the charge-receiving areas of the carrier by removing residual developer (electrostatically attracted material) before such areas are again introduced into the exposure chamber.

In certain preferred methods according to the invention use is made of X-radiation or δ-radiation and the ionizable gas mainly comprises gas particles which consist of or comprise an element with an atomic number of at least 35. The preferred gas is xenon. In such preferred embodiments the gas is preferably at a pressure above atmospheric pressure.

The invention includes apparatus for carrying out a method according to the invention as above defined. Such apparatus as broadly defined, comprises an exposure chamber having an inlet and an exit for a carrier for carrying electrostatic charge patterns at successive positions therealong; a said carrier which extends through such chamber; means for indexing said carrier to bring successive regions therealong into said chamber; means for introducing ionizable gas into said chamber for contacting insulating surface portions of said carrier and means for exposing said gas, in the chamber, to the influence of an electric field, thereby to cause positive or negative charge carriers which are produced in said gas when the latter is exposed to penetrating radiation distributed in a pattern according to information to be recorded, to form a corresponding electrostatic charge pattern on that insulating surface portion of the carrier which is for the time being exposed to said gas in said chamber.

The carrier of such apparatus is preferably an endless carrier as hereinbefore referred to. Such a carrier may be supported by rollers which guide the carrier through the exposure chamber.

Preferably means is provided whereby at least a part of the gas present in the said chamber (preferably a gas comprising gas particles consisting of or including an element with an atomic number of at least 35) can be removed therefrom between exposure stages. Preferably also, there is pressure control means for maintaining a substantially constant gas pressure in the chamber during exposure periods.

In certain apparatus according to the invention, there is within the chamber an electrode or group of electrodes which is spaced from the operatively positioned insulating charge-receiving surface portion of the carrier and is exposed to the ionizable gas when this is present; and the means for creating the electric field comprises that electrode or group of electrodes and a second electrode or group of electrodes, which latter forms part of the carrier or is located at the side thereof remote from the first electrode or electrode group.

Preferably the apparatus includes a developing station located outside the exposure chamber and having means for making electrostatically attractable material (developer) available to the electrostatic charge patterns and thus developing them to visible records or "images".

It is also preferable for the apparatus to include a transfer station where there is means for information-wise transferring all or part of the information-wise deposited developer to a receptor or receptors.

The apparatus may also include any one or more of the following stations: a neutralising station comprising an A.C. corona for removing residual charges from the carrier; a cleaning station comprising a mechanical or electrical cleaning means for removing non-transferred developer from the carrier; a radiation source for use in irradiating the charge-receiving areas of the carrier and thus dissipating residual charges before the said areas again enter the exposure chamber. The use of such a radiation source is applicable when the insulating surface areas of the carrier are photoconductive. When any two or more of the aforesaid A.C. corona, radiation source and cleaning means are provided, they may be arranged in any order along the path of the carrier. Cleaning means can be omitted in particular when the transfer of the developer, e.g. a toner, is complete, e.g. when an electrophoretically applied toner is completely transferred by electrophoresis from a still wet toner image to the receptor material.

This invention will be more easily understood by reference to the following detailed description and to the drawings in which.

It should be understood that in said drawings some dimensions of the layers, electrodes, etc. have been greatly exaggerated to show details of construction more clearly.

No inferences should be drawn as to the relative dimensions of the layers or spacings separating the various elemental parts of the imaging apparatus.

Figure 1:
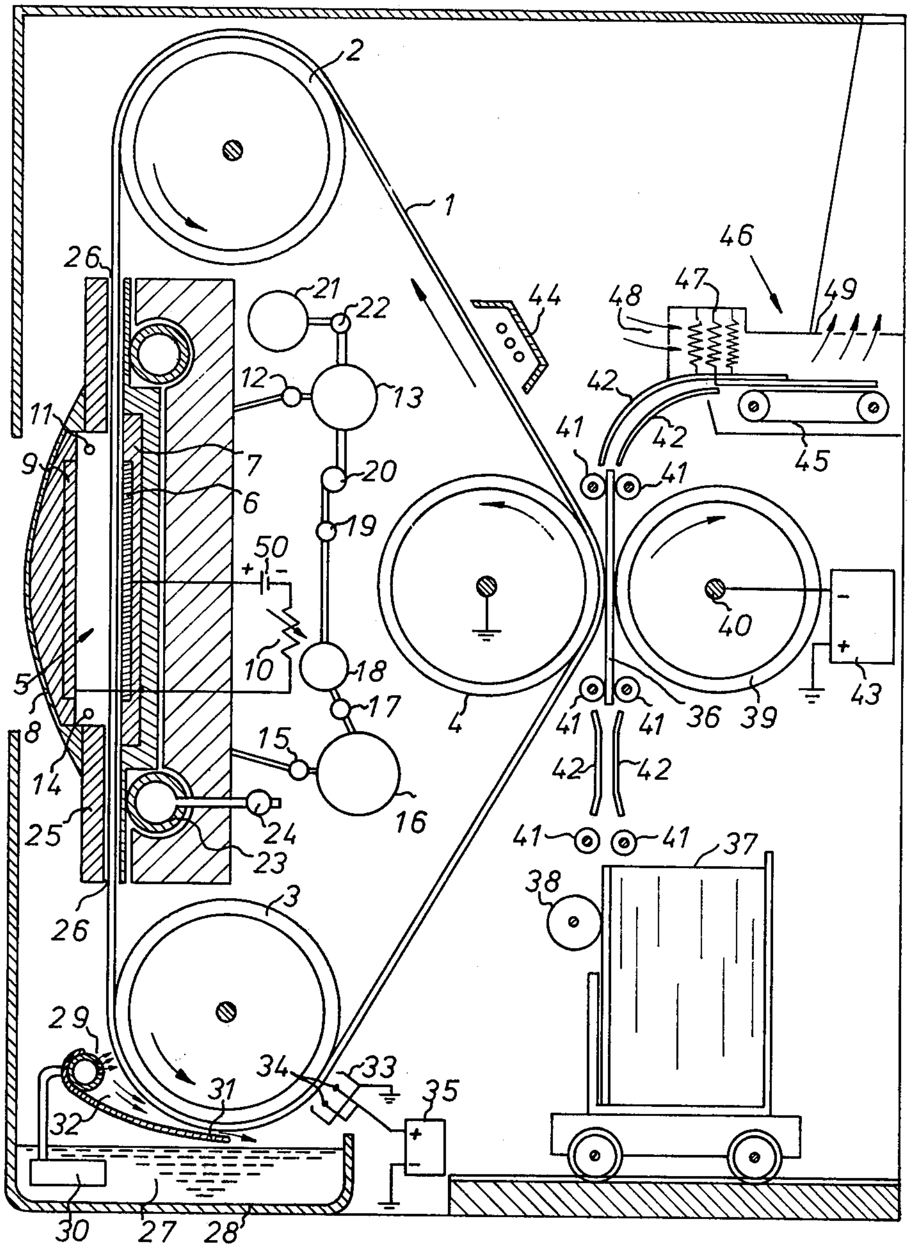
FIG. 1 represents a cross-sectional representation of a recording apparatus according to the present invention.

The recording apparatus illustrated in FIG. 1 contains an endless belt 1 that is moved around three guide rollers 2, 3 and 4 one of which is provided with drive means (not shown in the drawing). That drive means may consist of a chain wheel preferably coupled with the spindle of the guide roller 4. The chain wheel is provided with a driving chain driven by the sprocket wheel of an intermittently energizable electric drive motor.

According to a particular embodiment, the guide roller 2 is mounted in the frame of the apparatus in such a way that it acts not only as a guide roller but also as a tensioning roll. The correct belt tension is obtained by the vertical movement in parallel slots of the bearing blocks of the guide roller 2. These blocks (not shown in the drawing) are adjustably fixable in parallel slots that are provided in opposite frame walls of the apparatus.

The belt 1 is kept flat in the imaging chamber 5 by the tension applied to the belt and the presence of a belt support comprising a plate 6 that may act as an electrode, and an insulating holder 7 which insulates the plate 6 from the chamber wall.

The image chamber 5 contains a curved cover 8 made of an X-ray-transmitting material of low atomic number elements, e.g. beryllium alloy, magnesium alloy or a polymeric resin material of high tensile strength. Electrically insulated from said cover 8 an electrode plate 9 is arranged. Between this electrode plate 9 and the electrically insulating charge-receiving side of the belt 1 an X-ray absorbing gas, e.g. mainly containing xenon, is present.

According to a preferred embodiment an X-ray exposure is accomplished while having the X-ray absorbing gas at a pressure above atmospheric pressure e.g. at a pressure of at least 5 kg and more per sq.cm. The pressure desirably is a function of the gap width (distance between the electrode and the insulating charge receiving surface of the belt). The product of gap width and pressure is preferably between about 10 mm atmospheres and about 200 mm atmospheres.

During the X-ray exposure a DC-potential difference is maintained with a DC-potential source 50 between the electrodes 6 and 9. The electrode 6 acts e.g. as an anode, so that onto the insulating side of the belt 1 negative charge particles are attracted.

The voltage between said electrodes 6 and 9 is adjustable with a variable resistor 10. The variable resistor 10 brings preferably the voltage to a value that permits operation of the charge generation in the horizontal part of the Townsend curve (current versus voltage). In operation the applied voltage is preferably at least a thousand volts.

The chamber 5 is provided with a gas inlet 11 connected through a valve 12 to a pressure-reservoir 13. The chamber 5 is further provided with a gas outlet 14 connected through a valve 15 with a reservoir 16 for allowing the gas to expand to atmospheric pressure. From reservoir 16 the gas is pumped with a pump 17 into a pressure reservoir 18 from which, through an adjustable pressure outlet valve 19 with a force pump 20, it is introduced again in the reservoir 13. Gas losses are compensated by a supply of gas in the reservoir 13 from a pressure cylinder 21 that feeds the gas through the adjustable pressure control valve 22.

The chamber 5 is provided with a pneumatic sealing means as described with regard to FIG. 1 of the published German Patent Application Dt-OS 2,431,036 filed June 27, 1974 by National Research, in the form of an expandable hollow sealing ring 23 e.g. a ring tube of steel wire-reinforced rubber. In the sealing ring 23 air or liquid is introduced through the valve 24 up to the required sealing pressure. During the X-ray exposure the ring 23 presses the belt support towards the belt 1 and causes this to be clamped in sealing contact against the exposure window frame plate 25 of the electrode 9.

After the X-ray exposure the gas pressure in the imaging chamber 5 is reduced again to atmospheric pressure. The pressure in the ring 23 is reduced to a value allowing the advance of the belt 1 for the charge deposition in a next image frame. The entry and exit sides of the chamber 5 are provided with a narrow slot 26 to prevent the loss of a substantial amount of gas when moving the belt along its endless course.

The entry opening of the chamber 5 may be provided with a magnetizable fluid seal. At the entry side the belt is in uncharged state so that the magnetizable fluid may be conductive.

Figure 5:
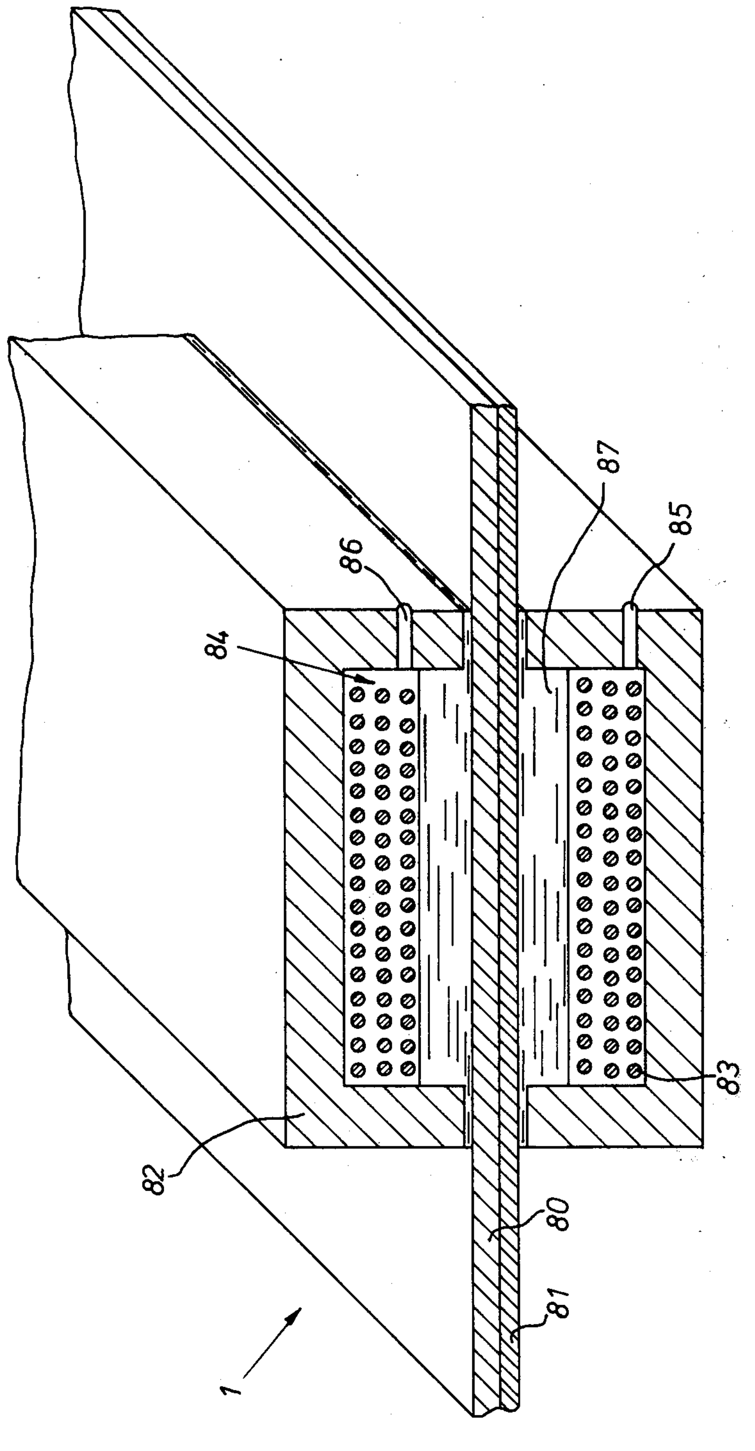
FIG. 5 represents a sealing means for preventing the escape of gas from the imaging chamber during the moving up of the endless belt.

A detailed sectional view of such seal is given in FIG. 5. The application of a magnetizable fluid for sealing purposes has been described in Philips Technisch Tijdschrift 33, no. 10, p. 301. In said seal a magnetizable fluid allows the passage of a solid material through the fluid without withdrawing fluid from the place where it remains by magnetic forces.

The use of hydrocarbon liquids in the production of magnetizable fluids has been described in Bedrijf & Techniek, 22, March 1973, page 305. At the exit side of the chamber the liquid of an electrophoretic developer may act as a liquid seal without distortion of the charge pattern, so that in one embodiment the chamber exit opening 26 is submerged in the electrophoretic developer liquid.

According to the embodiment illustrated in FIG. 1 the development proceeds with an electrophoretic liquid developer 27 comprising solid toner particles dispersed in an electrically insulating liquid.

According to the embodiment illustrated in FIG. 1 the liquid developer 27 is contained in a receptacle or tray 28 and applied through a nozzle 29 onto the electrostatic image bearing surface of the belt 1. A pump 30 is disposed within the developing tray 28 to force the developing liquid 27 through the nozzle 29.

An arcuate developing electrode 31 extends from the nozzle 29 to define a wedge-shaped flow passage 32 in cooperation with the belt 1, so that a turbulent flow of the developing liquid 27 is provided in said wedge-shaped flow passage 32. This arrangement ensures only the charge image-bearing surface of the belt 1 to be effectively exposed to fresh developing liquid. As explained in the U.S. Pat. No. 3,722,994 of Hiroshi Tanaka, Takashi Salto, Shusei Tsukada, Toru Takahashi and Hajime Katayama issued Mar. 27, 1973, the optionally but preferably present corona-discharging unit 33 serves as a means for removing excessive developing liquid from the belt 1. The corona discharger 33 has therein filaments 34 of tungsten or like material having a diameter in the order of magnitude from 5/100 to 10/100 mm and disposed perpendicularly to the path of the belt 1. A high voltage is applied from a power source 35 to the corona discharger 33.

The electric charges of the corona discharger 33 removing excessive developing liquid have a positive polarity when a positive developing toner is used.

The transfer of the still wet toner image to a transparent resin receptor sheet 36 of a desired format is accomplished at the transfer station at which such receptor sheet 36 is fed from a movable rapidly exchangeable supply stack 37 by means of dispensing feed rollers 38 in timed relation to the arrival of the image frame of the belt 1 at the transfer station.

The transfer of electrophoretically deposited toner may proceed by pressure transfer as described in the United States Defensive Patent T 879,009 of William J. Staudenmayer and William Trachtenberg issued Nov. 13, 1970, by electrostatic attraction e.g. by applying a DC voltage by voltage source 43 between the transfer roller 39 and the guide roller 4 and/or the conductive belt surface contacting the guiding roller 4, or by applying a corona charge on the rear side of the receiving material. For positive-to-positive reproductions the polarity of the corona transfer unit must be the same as that used in the ionographic image-wise charging. The transfer proceeds in that case by electrophoresis as described, e.g. in the published German Patent Applications Nos. 2,144,066 filed Sept. 2, 1971 by Canon and 2,147,646 filed Sept. 9, 1971 by Canon.

The pressure or interspace between the belt-covered-guide roller 4 and the transfer roller 39 is variable in order to obtain the best toner transfer conditions in the transfer method chosen. For that purpose (not shown in the drawing), according to one embodiment the ends of the shaft of the transfer roller 39 are journalled in insulating bearings, which in turn are received in interconnected pivotal yoke members against which a plunger actuated with a tension adjustable coiled spring offers the necessary or desired pressure to the ends of the shaft of the transfer roller 39.

Greater or lesser gap distance or pressure between the transfer roller 39 and the guiding roller 4 is achieved by increasing or decreasing the compression of said coiled spring.

In the circumstances of transferring still wet toner particles by electrophoresis the transfer roller 39 is made of resilient material e.g. rubber, having a resistivity in the range of from $10^{16}$–$10^{11}$ ohm.cm. The metal shaft 40 of the transfer roller 39 has the same polarity as the electrostatic charges have in the image-wise charged portions of the belt 1. The voltage applied to the conductive shaft 40 of the transfer roller 39 is, e.g., in the range of from 100 to 10,000 volts, the conductive guide roller 4 being connected to the ground.

The supply stack of receptor sheets 36 is located beneath the transfer roller 39. Motor driven feed rollers 41 are frictionally engaged in opposite margins of the outermost sheet of the stack 37 from which the sheet 36 is moved by the rollers 38 into the slots formed by guiding bars 42.

It has to be mentioned, however, that a roll feed can be used in conjunction with a suitable cutting means for severing the image receptor sheets in the desired format once the toner image has been transferred thereto.

An AC corona unit 44 (which is optional) serves to neutralize residual charges and facilitates the removal of possibly non-transferred toner e.g. with a cleaning web or other cleaning means well known in the art but not shown in the drawing. A "web" type cleaning apparatus is disclosed e.g. in U.S. Pat. No. 3,186,838 of William P. Graff, Jr. and Robert W. Gundlach issued June 1, 1965. According to said patent removal of residual toner is effected by rubbing a web of fibrous material against the insulating belt surface. The web of fibrous material is advanced into pressure or wiping contact with the imaging belt surface.

On leaving the nip formed between the transfer roller 39 and the belt area covering the guide roller 4 the receptor sheet material 36 passes between transport rollers 41 and guide bars 42 and is carried by a conveyor belt 45 into the fixing and drying station 46.

In said station 46 air heated by electrical filaments 47 strikes over the wet toner image and dries and fixes the image-wise deposited toner substance on the receptor material 36. The air enters the station 46 through the inlet 48 and leaves the apparatus through the outlet 49 situated at the top side.

When using a belt with photoconductive insulating surface layer residual charges can be erased by allowing them to leak off through a conductive base of the belt to the ground by exposing the photoconductive belt layer to electromagnetic radiation increasing its conductivity. Such a charge erasure technique has been described, e.g. in the French Pat. No. 1,314,384 filed May 17, 1961 by Gevaert Photo-Producten N.V.

The present invention is not restricted to ionography with a X-ray absorbing gas under pressure above atmospheric pressure. The present invention includes the above defined method and apparatus modified in such a way that they operate with an ionizable liquid or solid photocathode of an element with high atomic number, e.g. gold or lead, and an ionizable gas under substantial atmospheric pressure as described, e.g. in the German Pat. No. 1,497,093 mentioned hereinbefore. In order to compensate for the low maximum quantum efficiency of these photocathodes electron avalanche amplification is produced in the ionizable gas between the photocathode and the counter-electrode covered with the charge-receiving insulating material.

The use of the electron avalanche image intensification in an X-ray-absorbing gas, e.g. iodomethane, under a pressure above atmospheric pressure has been described in the published German Patent Application Dt-OS 2,226,130 mentioned herein-before wherein an ionographic imaging chamber operating with an electrode divided into narrow parallel electrically connected strips is described.

The use of a flexible endless belt in copying machines has been described already, e.g. in the U.S. Pat. Nos. 3,533,692 of Robert G. Blanchette and Loren E. Shelffo issued Oct. 13, 1970 and 3,620,614 of Robert L. Gunto and Henry A. Mathisen issued Nov. 16, 1971. The construction of such a belt is set forth in detail in said U.S. Pat. No. 3,533,692. In general this belt includes a flexible insulating base that can be formed of a number of materials but in a preferred embodiment is made of polyethylene terephthalate film sold e.g. under the registered trade mark "MYLAR" by Du Pont de Nemours, U.S.A. Applied to one surface of the insulating base is a continuous layer of an electrical conductor such as aluminium, copper or chromium. This layer or metallized surface can have a thickness ranging from 0.05 mil to 0.50 mil.

Figure 3:
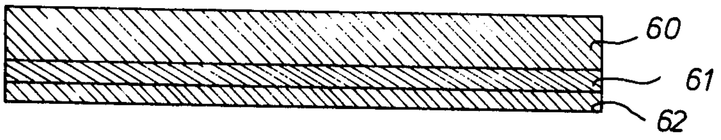
FIGS. 3 and 4 represent cross-sections of endless belt structures for use in an apparatus according to the present invention.
Figure 4:
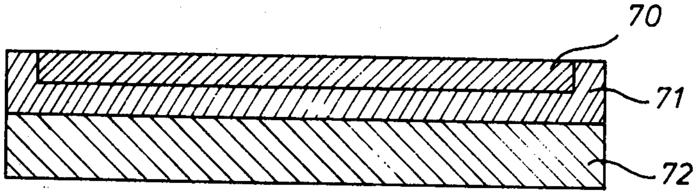

In FIGS. 3 and 4 sectional views of different endless belt structures are given.

In the embodiment of FIG. 3 the endless belt is manufactured out of a non-conductive, moisture resistant organic resin material, e.g. polyethylene terephthalate film 60 or any other high resistivity plastic film material having a surface resistivity greater than $10^{13}$ ohm per square. The rear side of the belt is provided with a subbing layer 61 made, e.g., of a copolymer of vinylidene chloride and vinyl chloride as described in the United Kingdom Pat. No. 1,234,755 filed Sept. 28, 1967 by the Applicant. Said subbing layer 61 is coated with a layer 62 containing a polyionic resin such as CALGON CONDUCTIVE POLYMER (trade mark) in order to provide to that a surface resistivity in the range of $10^6$–$10^{12}$ ohm per square.

According to the embodiment of FIG. 4 a layer 70 of photoconductive material is disposed on a thin metal film or metallized surface 71. The metal film or layer is applied to an insulating film base 72 e.g. polyethylene terephthalate film.

The composition and method of applying the photoconductive layer 70 is set forth in detail in the above cited U.S. Pat. No. 3,533,692. In a preferred embodiment the layer 70 comprises an organic photoconductive polymeric film, e.g. on the basis of a N-vinylcarbazole homopolymer or copolymer.

When the photoconductive layer 70 is applied or formed it is disposed inwardly from the marginal edge or edges of the belt base 72 so as to leave a continuous area of the electrically conductive layer 71 to establish thereto, e.g. with a sliding contact means, the potential of the belt support electrode (electrode 6 of FIG. 1).

In the composition of the photoconductive insulating charge-receiving layer inorganic photoconductive pigments, e.g. photoconductive zinc oxide, cadmium sulphide or cadmium sulphide selenide in an insulating binder may be used.

In the X-ray recording technique of the present invention the photoconductor (if used) should itself not obtain a substantial increase of conductivity in the area struck by the information-wise modulated X-rays. Indeed, as illustrated with the apparatus of FIG. 1 a charge image has to be built up on the belt in the X-ray exposed area.

Therefore, preference is given to organic photoconductors that have a particularly low X-ray sensitivity and that can be easily coated and dye-sensitized for obtaining increased visible light sensitivity.

Many organic compounds have been reported to have photoconductive properties. Among these substances are monomeric as well as polymeric compounds.

An organic photoconductor, when having itself layer-forming properties, can be applied from a solution to the conductive base or interlayer. Particularly useful for that purpose are vinyl polymers containing vinylcarbazole units, as described e.g. in the U.K. Pat. No. 964,875 filed Apr. 21, 1960 by Gevaert Photo-Producten N.V., and halogenated derivatives of poly(N-vinylcarbazole).

The poly(N-vinylcarbazole) may be sensitized to increase its photoresponse by including additives such as $\pi$-complex acids, which are disclosed in detail in U.S. Pat. No. 3,037,861 of Helmut Hoegl, Oskar Sus and Wilhelms Neugebauer issued June 5, 1962. For example, the resin poly(N-vinylcarbazole) may be coated on a conductive substrate in admixture with compounds such as anhydrides, fluorenones, quinones and/or acids.

In the class of the organic photoconductors that are preferably used in admixture with an insulating resin are mentioned particularly the photoconductive compounds in which atoms or groups of different electron-affinity are linked by a conjugated system. Such organic photoconductors are e.g.: 2,5-bis(p-diethylaminophenyl)-1,3,4-oxadiazole, 2,5-bis(p-diethylaminophenyl)-1,3,4-triazole, 2,4,5,7-tetranitro-9-fluorenone, the quinoline derivatives described in the published German Patent Application P 20 13 410 filed Mar. 20, 1970 by Agfa-Gevaert AG, the dihydro- and tetrahydroquinoline derivatives described in the published German Patent Applications (Dt-OS) 2,159,804 filed Dec. 2, 1971 by Agfa-Gevaert AG, 2,160,873 filed Dec. 8, 1971 by Agfa-Gevaert AG and 2,245,573 filed Nov. 8, 1972 by Agfa-Gevaert AG.

As film-forming electrically insulating binders synthetic resins such as vinyl polymers, polyacrylates, isobutylene, polyethylene, cellulose ethers, and chlorinated rubbers may be used. Especially useful results are obtained with chlorinated vinyl polymers as binder.

Since the belt itself acts as a kind of sealing joint in the imaging chamber of FIG. 1 it may be advantageous to use a belt comprising a compressible flexible material, e.g. in the form of an urethane foam layer. Such foam layer renders the belt also more pliable as has been described in the U.S. Pat. No. 3,653,755 of Arthur S. Serfahs and Robert C. Patzke issued Apr. 4, 1972.

According to a special embodiment the belt is elastic or contains elastic image frames. An elastic belt or a belt with elastic image frames offers the possibility of remedying a phenomenon called "geometric unsharpness" characteristic of ionography operating with a relatively broad gas gap.

The fundamental source of geometric unsharpness in the ionographic formation of an electrostatic latent image as explained in the U.S. Pat. No. 3,859,529 of Andrew P. Proudian, Teodoro Azzarelli and Murray Samuel Welkowsky issued Jan. 7, 1975 resides in the lack of coincidence between the line along which incident X-rays create photoelectrons, and the electric field lines which accelerate those electrons to the receptor, which is here the belt. A solution to that problem has been proposed by the use of rigid spherical cap electrodes as described in the U.S. Pat. No. 3,828,192 of Arthur Lee Morsell issued Aug. 6, 1974. and the use of elastic spherical cap electrodes as described in the published German Patent Application No. 2,431,036 mentioned hereinbefore and illustrated by the FIG. 3 and 5 of that Application.

Figure 2:
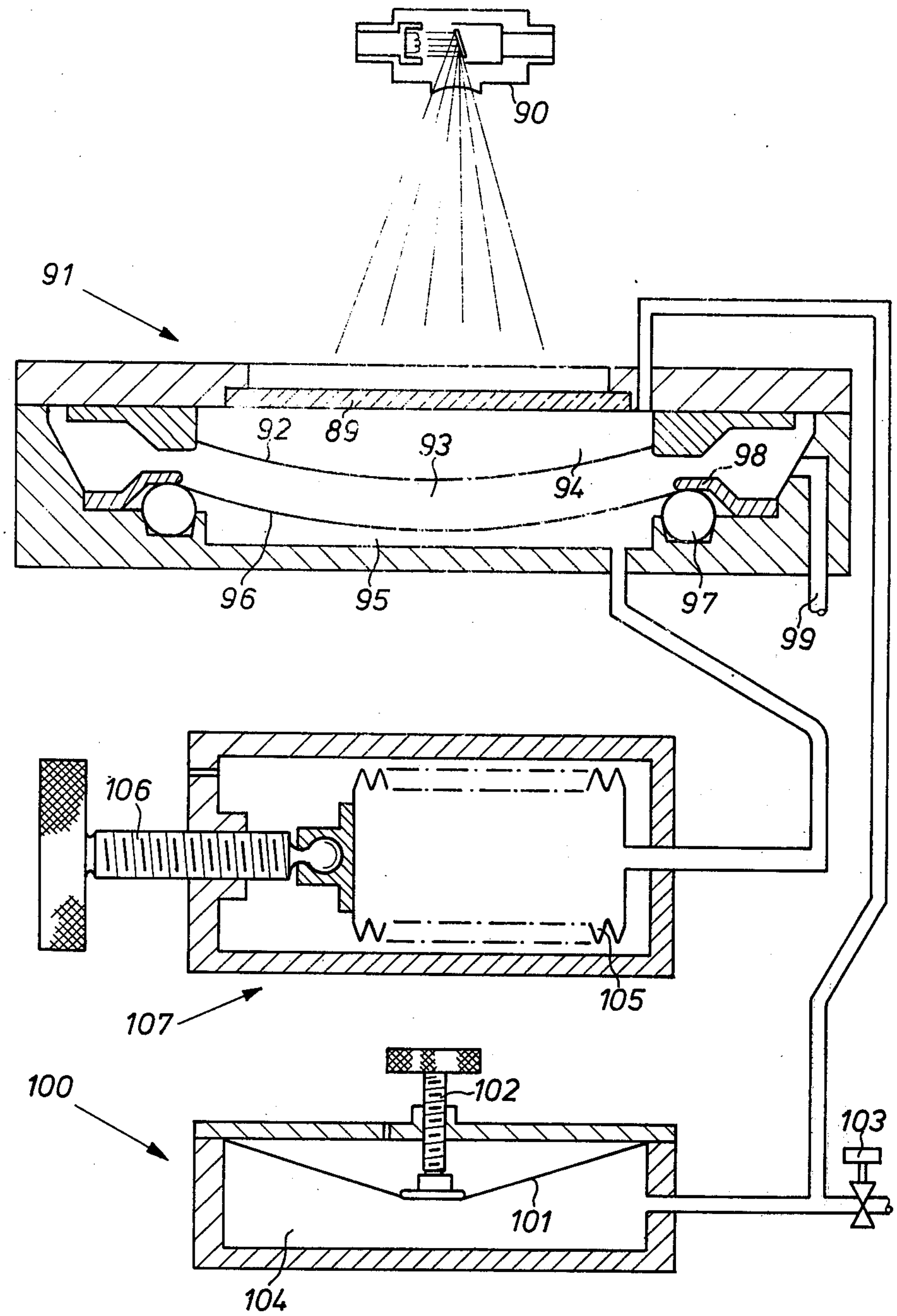
FIG. 2 represents a cross-sectional representation of an imaging chamber with elastic electrode and elastic endless belt suited for producing images that do not suffer or to a minor extent suffer from "geometric unsharpness".

In FIG. 2 of the present invention the sheet electrode 3 of FIG. 5 of said published German Patent Application is replaced by an elastic endless belt having a conductive rear-side coating.

In FIG. 2 element 90 represents an X-ray-emitting radiation source. The imaging chamber 91 contains an elastic circular sheet electrode 92 made e.g. of a synthetic resin elastomer being coated with a conductive metal layer, e.g. a vacuum-coated aluminium layer at the side of the ionizable X-ray-absorbing gas, e.g. xenon, contained under pressure during the X-ray exposure in the dishlike space 93. Through an inlet 99 ionizable gas under pressure is introduced in said space 93 as described in connection with present FIG. 1. After each X-ray exposure the pressure in said space 93 is brought down again to atmospheric pressure. The space 94 above the space 93 is put under pressure with air or an other gas or gas mixture that poorly absorbs X-rays. Hereby the elastic sheet electrode 92 (membrane) during the exposure has a spherical curvature as shown in the drawing. Simultaneously, the pressure in the space 95 is adapted in such a way that the image frame of the endless belt 96 clamped with the pneumatic sealing ring element 97 (described as element 23 in FIG. 1) against the image frame ring 98 obtains substantially the same curvature as the electrode 92.

The curvature corresponds substantially with the radius having its origin in the focus of the X-ray source 90.

The space 94 having an X-ray-transmitting wall 89 is brought under pressure with e.g. air in using a gas-compressing means, of which the device 100 is an example. In said device air is compressed with a flexible elastic membrane 101 that is movable with a bolt 102 as shown in the drawing. Through a valve 103 air is introduced in the compressor space 104 previously to the introduction under pressure of air in the space 94. The pressure in the space 95 is obtained with air or an other gas, which may be the same gas as used in the imaging space 93.

Said air or gas is allowed to expand in the bellows 105 to offer the desired curvature to the clamped image frame of the endless belt 96. The bellows 105 are compressed or expanded by turning the bolt 106 arranged through the wall of the housing 107.

Another embodiment for reducing or excluding geometric unsharpness has been claimed in the U.S. Pat. No. 3,859,529 mentioned hereinbefore. Said embodiment may be applied in the imaging chamber used in the present invention. Such imaging chamber contains according to that embodiment first and second substantially planar electrodes; means for mounting said electrodes in the chamber in spaced relation defining a gap therebetween; means for maintaining along the gap surfaces of said electrodes, electrostatic potentials such that the electric field lines in said gap converge substantially to a point.

Instead of using a metal layer to render the belt conductive in the area electrically contacting the supporting electrode the belt may be of such structure that substances dispersed in the mass of the support offer the desired conductivity. So, the belt may contain an insulating layer on a paper or resin film that, internally, is made conductive by incorporating in the paper or resin mass substances that improve the conductivity. For that purpose, conductive pigments, e.g. carbon black, salts or polyionic resins may be incorporated. In the resin used for the supporting part of the belt carbon black or colloidal metal particles may be incorporated.

According to a particular embodiment the belt support consists of a flexible metal foil, e.g. a foil made of steel.

According to a special embodiment the electrostatic image receptor does not provide a continuous and endless charge-receiving surface but comprises an endless series of substantially rigid charge-receiving plates that form image frames. These plates may, e.g. be arranged on an endless carrier belt or they may be connected to each other by hinges or flexible joints to form an endless carrier system.

The substantial gas-tight sealing of the imaging chamber at atmospheric pressure during the period for moving up the belt poses a problem that can be solved in various ways.

According to one embodiment use is made of the already mentioned magnetizable fluid seal. In FIG. 5 a sectional view of such seal allowing the moving up of the charge receiving belt through the imaging chamber is given.

In FIG. 5 the endless belt is represented by element 1 and composed of an insulating endless organic insulating resin film 80 coated with a thin conductive metal layer 81 e.g. copper layer.

The belt passes through a slot in a magnetizable core 82, which is laminated (not shown) when the powering of the turns 83 of the coil 84 proceeds with alternating current.

The coil 84 is electrically connected with an electric power DC or AC source (not shown) through the gas-tightly closed openings 85 and 86 incorporating insulated lead entrance means. The magnetizable fluid 87 forms a magnetizable liquid core closing the magnetic flux lines set up in the solid core material 82. The use of the magnetizable fluid seal is not restricted to the sealing of gases at atmospheric pressure buy may be used to seal envelopes or chambers that contain a fluid (gas or liquid) at a pressure above atmospheric pressure, e.g. up to 30 atm.

Although in the present FIG. 1 the electrophoretic development has been illustrated the invention is not restricted by the type of development and fixing of the toner image.

All known developing techniques based on the use of electrostatically attractable material may be applied.

Common developing techniques are known as "dry" toner and "wet" toner developing techniques.

According to the "dry" toner developing technique the development proceeds by dusting the insulating layer or sheet in the image frame area with finely divided solid particles that are image-wise electrostatically attracted or repulsed so that a powder image in conformity with the charge density is obtained.

Well-established methods of dry development of the electrostatic latent image include cascade, powder-cloud (aerosol), magnetic brush, and fur-brush development. These are all based on the presentation of dry toner to the surface bearing the electrostatic image where coulomb-forces attract or repulse the toner so that, depending upon electric field configuration, it settles down in the electrostatically charged or uncharged areas. The toner itself preferably has a charge applied by triboelectricity. The powder image is, e.g., fixed by heat or solvent treatment.

For high resolution work in dry development powder cloud development yields particularly good results.

The "wet" electrophoretic developers are appropriate to very high resolution work and therefore particularly useful in connection with industrial and medical X-ray recording.

Suitable toner compositions for electrophoretic development are described, e.g. in the U.K. Pat. Nos. 1,151,141 filed Feb. 4, 1966 by Gevaert-Agfa N.V. and 1,312,776 filed July 25, 1969 by the Applicant, and in the published German Patent Applications (Dt-OS) P 2,334,353 filed July 6, 1973 by Agfa-Gevaert AG and P 2,333,850 filed July 3, 1973 by Agfa-Gevaert AG.

The electrostatic image can likewise be developed according to the principles of "wetting development" as described, e.g. in the United Kingdom Patent Specifications Nos. 987,766 filed Apr. 18, 1962 by Agfa Ag, 1,020,505 filed Nov. 8, 1961 by Gevaert Photo-Producten N.V. and 1,020,503 filed Nov. 8, 1961 by Gevaert Photo-Producten N.V.

According to a particular embodiment (illustrated in FIG. 1) the charge pattern is developed in direct relation to the quantity of charge, instead of to the gradient of charge (fringe effect development). Therefore the developer material is applied while a closely spaced conductor (developing electrode) is situated parallel to the insulating charge-receiving member.

A "dry" or "wet" toner developing technique, which operates without developing electrode, is described e.g.

in the U.S. Pat. No. 3,731,656 of Karel Frans de Troeyer issued May 8, 1973.

The permanent adherence of the toner image to a receptor-sheet, e.g. transparent resin sheet, may pose a problem and therefore special fixing procedures may be applied in conjunction with the present recording method.

One useful procedure for subsequent by improving the fixing of toner images is the application of a lacquer overcoat. In practice the lacquer is usually applied by spraying a resin solution on the toner image. Another method consists in the application of the resin solution by means of an applicator roller.

The toner pattern may be transferred onto any type of opaque or transparent receptor material, transparent resin receptor materials being preferred for image inspection on a light box.

When the toner transfer proceeds by electrostatic forces preferably a receptor material with electrically insulating receptor surface is used. For example, use is made of a recording sheet or web consisting of a paper base coated with an insulating layer of, e.g. polyethylene or a transparent resin web or sheet that is coated with an antistatic layer, optionally at its rear side.

Substances suited for enhancing the conductivity of the rear side of a transparent resin web or sheet are, e.g. antistatic agents of the polyionic type, e.g. CALGON CONDUCTIVE POLYMER 261 (trade mark of Calgon Corporation, Inc. Pittsburgh, Pa., U.S.A.) for a solution containing 39.1% weight of active conductive solids, which contain a conductive polymer having recurring units of the following type:

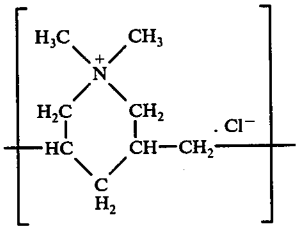

and vapour deposited films of chromium or nickel-chromium about 3.5 μm thick and that are about 65 to 70% transparent in the visible range.

Copper (I) iodide conducting films can be made by vacuum depositing copper on a relatively thick resin base and then treated with iodine vapour under controlled conditions (see J. Electrochem. Soc., 110-119, Feb. 1963). Such films are over 90% transparent and have surface resistivities as low as 1500 ohms per square. The conducting film is preferably overcoated with a relatively thin insulating layer as described, e.g., in the J. Soc. Motion Picture Television Engrs., Vol. 74, p. 667.

We claim:

1. A method for recording and reproducing a pattern of penetrating radiation comprising radiation selected from the group consisting of X-rays and γ-rays, wherein said method comprises the steps of:

(a) exposing to a pattern of said penetrating radiation an ionizable fluid contained in a chamber between an electrode and an insulating obverse surface area of an elongated endless belt having at least one such surface area thereon and passing through one side of said chamber while applying a DC-potential difference between said electrode and an electrode adjacent the reverse surface of the endless belt, to thereby form a pattern of positive or negative charge carriers in said fluid which are biased by said potential onto said insulating surface area of said endless belt, creating an electrostatic charge pattern on said insulating surface area, the side of said chamber through which said belt passes being immersed in an insulating liquid to form a seal around said belt, (b) advancing said belt to remove said charged surface area from said chamber and pass the same through said insulating liquid, (c) contacting said charged surface area with an electrostatically attractable material contained in said insulating liquid to develop said pattern into a visible image, (d) transferring said image of electrostatically attracted material to a receptor material, (e) neutralizing residual charge on said surface area, (f) cleaning said surface area by effecting the removal of residual electrostatically attracted material before bringing said surface area in contact again with said ionizable fluid, and (g) returning said cleaned surface area of said belt into said chamber for a repetition of said steps.

2. A method according to claim 1, wherein said elongated belt extends in an endless path and the charge-receiving surface areas thereof are repeatedly used by repeatedly advancing said belt through said path in one direction.

3. An apparatus for making radiographic prints comprising:

(a) re-usable endless belt carrying at least a plurality of insulating electrostatically chargeable surface areas thereon, said belt being stretched for movement along an endless path about a series of guide rollers, including at least two guide rollers to establish a planar course of the belt between them, (b) an exposure station comprising:

(1) a radiographic imaging chamber enclosing a stretch of said belt in said planar course and containing entry and exit openings through which said belt can move along said planar course when said openings are not closed, (2) sealing means for said openings comprising a body of insulating liquid in which said exit opening is immersed to seal the same, said insulating liquid containing electrophoretic toner particles for developing electrostatically charged surface areas on said belt upon passage of the same through said body of insulating liquid, (3) means for introducing into said chamber at least when said openings are closed in ionizable gas capable of forming a charge pattern on an insulating surface area of said belt when exposed information-wise to penetrating radiation, and (4) means in the chamber for forming an electric field comprising at least one electrode which is spaced frm the charge-receiving surface area of the endless belt and at least one second electroce is located adjacent the side of the belt remote from said first electrode, said electrodes being provided with terminals for applying therebetween a DC-potential difference at least at the moment of the exposure of the ionizable gas to penetrating radiation, (c) a transfer station comprising a means for transferring at least a substantial portion of toner image from the belt surface to a receiving material, (d) a cleaning station comprising a mechanical or electric means for removing residual toner from the belt surface, (e) a means for removing residual electrostatic charges from the belt, and (f) drive means for recycling the endless belt in said endless path through said stations.

4. An apparatus according to claim 3, wherein the chamber contains said second electrode in the form of a supporting plate for the belt.

5. An apparatus according to claim 3, wherein the chamber in closed state contains xenon gas at superatmospheric pressure.

6. An apparatus according to claim 3, wherein the entry opening of the chamber through which the belt enters is provided with a seal containing a magnetizable fluid, which remains in its place by magnetic forces.

7. An apparatus according to claim 3, wherein the chamber is provided with a gas inlet connected through a valve to a pressure reservoir and is provided with a gas outlet connected through a valve with a reservoir for allowing the gas to expand to atmospheric pressure.

8. An apparatus according to claim 7, wherein the chamber is provided with a pneumatic sealing means in the form of an expandable hollow sealing ring, which seals the entry opening thereof through which the belt passes.

* * * * *